(12) United States Patent
Nagase et al.

(10) Patent No.: US 9,059,465 B2
(45) Date of Patent: Jun. 16, 2015

(54) POSITIVE ELECTRODE ACTIVE MATERIAL FOR LITHIUM ION BATTERY, POSITIVE ELECTRODE FOR SECONDARY BATTERY, AND LITHIUM ION BATTERY

(75) Inventors: Ryuichi Nagase, Ibaraki (JP); Yoshio Kajiya, Ibaraki (JP)

(73) Assignee: JX Nippon Mining & Metals Corporation, Tokyo (JP)

(*) Notice: Subject to any disclaimer, the term of this patent is extended or adjusted under 35 U.S.C. 154(b) by 344 days.

(21) Appl. No.: 12/936,476

(22) PCT Filed: Feb. 20, 2009

(86) PCT No.: PCT/JP2009/052976
§ 371 (c)(1),
(2), (4) Date: Oct. 5, 2010

(87) PCT Pub. No.: WO2009/128289
PCT Pub. Date: Oct. 22, 2009

(65) Prior Publication Data
US 2011/0031437 A1 Feb. 10, 2011

(30) Foreign Application Priority Data
Apr. 17, 2008 (JP) .................. 2008-107374

(51) Int. Cl.
*H01M 4/525* (2010.01)
*H01M 4/52* (2010.01)
*C01G 53/00* (2006.01)
*H01M 4/505* (2010.01)
*H01M 10/0525* (2010.01)
*H01M 4/02* (2006.01)

(52) U.S. Cl.
CPC ............... *H01M 4/525* (2013.01); *H01M 4/52* (2013.01); *H01M 2004/028* (2013.01); *C01G 53/006* (2013.01); *H01M 4/505* (2013.01); *H01M 10/0525* (2013.01); *Y02E 60/122* (2013.01)

(58) Field of Classification Search
CPC ....... H01M 4/525; H01M 4/52; H01M 4/505; H01M 10/0525; H01M 2004/028; Y02E 60/122; C01G 53/006
USPC ......... 429/231.3, 231.1, 223, 224; 252/182.1; 423/594.3, 594.5, 599
See application file for complete search history.

(56) References Cited

U.S. PATENT DOCUMENTS

| | | | |
|---|---|---|---|
| 6,395,250 B2 | 5/2002 | Matsubara et al. |
| 6,497,854 B2 | 12/2002 | Kohiro et al. |
| 6,677,082 B2 | 1/2004 | Thackeray et al. |
| 6,811,923 B1 | 11/2004 | Sakai et al. |
| 6,964,828 B2 | 11/2005 | Lu et al. |
| 7,078,128 B2 | 7/2006 | Lu et al. |
| 7,226,698 B2 | 6/2007 | Jung et al. |
| 7,288,242 B2 | 10/2007 | Tasaki et al. |
| 7,309,543 B2 | 12/2007 | Shizuka |
| 7,563,540 B2 | 7/2009 | Han et al. |
| 7,799,301 B2 | 9/2010 | Kajiya et al. |
| 2002/0150820 A1 | 10/2002 | Kanai et al. |
| 2004/0241084 A1 | 12/2004 | Kajiya et al. |
| 2005/0019661 A1 | 1/2005 | Han et al. |
| 2005/0142440 A1 | 6/2005 | Yamaki et al. |
| 2005/0265909 A1 | 12/2005 | Kajiya et al. |
| 2006/0121350 A1 | 6/2006 | Kajiya et al. |
| 2007/0027015 A1 | 2/2007 | Zhou et al. |
| 2007/0202405 A1 | 8/2007 | Shizuka et al. |
| 2008/0182169 A1 | 7/2008 | Shizuka |
| 2009/0011334 A1 | 1/2009 | Shizuka et al. |
| 2009/0166187 A1 | 7/2009 | Nagase et al. |
| 2009/0200508 A1 | 8/2009 | Nagase et al. |
| 2010/0209771 A1 | 8/2010 | Shizuka et al. |
| 2011/0065002 A1 | 3/2011 | Nagase |

FOREIGN PATENT DOCUMENTS

| CN | 1884089 A | 12/2006 |
|---|---|---|
| EP | 1391950 A1 | 2/2004 |

(Continued)

OTHER PUBLICATIONS

Sung Woo Oh et al., "Structural and Electrochemical Properties of Layered Li[Ni0.5Mn0.5]1-xCoxO2 Positive Materials Synthesized by Ultrasonic Spray Pyrolysis Method", Solid Stated Ionics, vol. 171, pp. 167-172, Apr. 2004.

*Primary Examiner* — Laura Weiner
(74) *Attorney, Agent, or Firm* — Howson & Howson LLP

(57) ABSTRACT

Provided is a positive electrode active material for a lithium ion battery positive electrode material made of lithium-containing nickel-manganese-cobalt composite oxide of a layered structure represented with $LiaNixMnyCozO_2$ ($1.0<a<1.3$, $0.8<x+y+z<1.1$), wherein, in a region with a molar volume Vm that is estimated from a lattice constant calculated from a (018) plane and a (113) plane in a powder X-ray diffraction pattern using CuK alpha rays as a vertical axis and Co ratio n (molar %) in metal components as a horizontal axis, the relationship thereof is within a range of $Vm=21.276-0.0117\,n$ as an upper limit and $Vm=21.164-0.0122\,n$ as a lower limit, and a half value width of both the (018) plane and the (113) plane is 0.200° or less. As a result of studying and defining the relationship of the cobalt (Co) ratio and the lattice constant, which are considered to influence the crystal structure, obtained was a positive electrode active material having high crystallinity, high capacity and high security. By using this material, it is possible to obtain a positive electrode active material for a lithium ion battery that is able to further ensure the characteristics and safety of the lithium ion battery.

17 Claims, 1 Drawing Sheet

(56) References Cited

FOREIGN PATENT DOCUMENTS

| | | |
|---|---|---|
| JP | 01-294364 A | 11/1989 |
| JP | 08-329938 A | 12/1996 |
| JP | 10-228905 A | 8/1998 |
| JP | 11-307094 A | 11/1999 |
| JP | 2001-319648 A | 11/2001 |
| JP | 2002-145623 A | 5/2002 |
| JP | 2003-059490 A | 2/2003 |
| JP | 2003-068298 A | 3/2003 |
| JP | 2003-089526 A | 3/2003 |
| JP | 2005-255433 A | 9/2005 |
| JP | 2005-285572 A | 10/2005 |
| JP | 2005-310421 | * 11/2005 |
| JP | 2005-310421 A | 11/2005 |
| JP | 2006-273620 A | 10/2006 |
| WO | 2006/049001 A1 | 5/2006 |
| WO | 2007/083457 A1 | 7/2007 |
| WO | 2008/012970 A1 | 1/2008 |

* cited by examiner

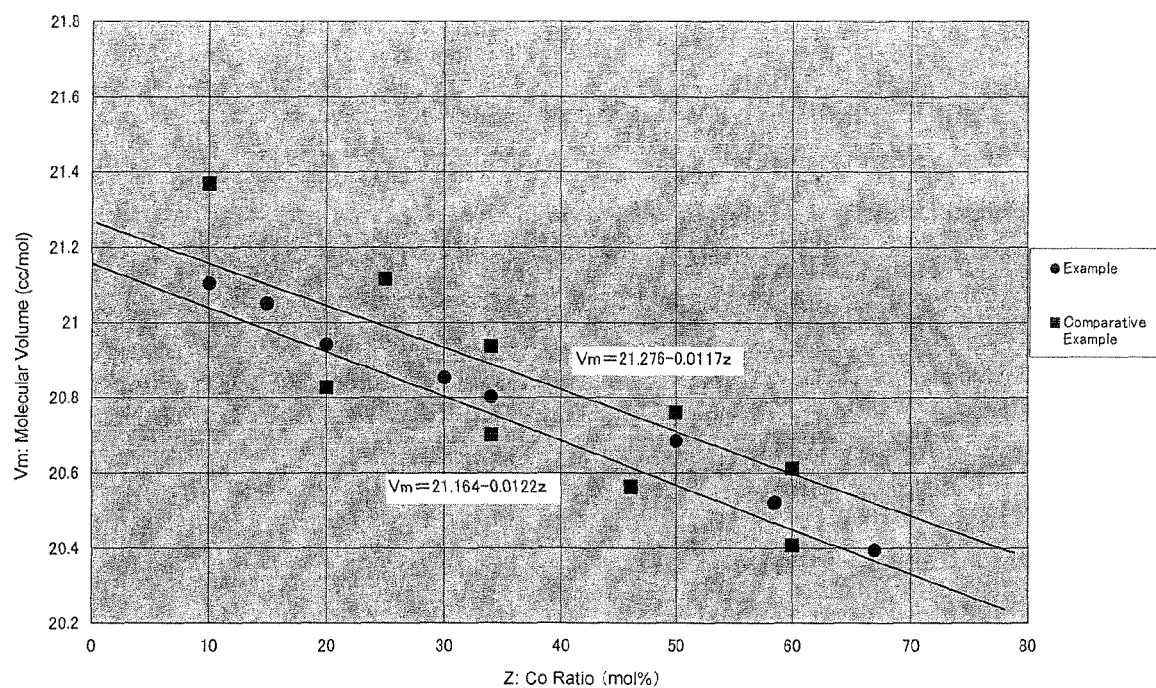

POSITIVE ELECTRODE ACTIVE MATERIAL FOR LITHIUM ION BATTERY, POSITIVE ELECTRODE FOR SECONDARY BATTERY, AND LITHIUM ION BATTERY

BACKGROUND OF THE INVENTION

The present invention generally relates to a positive electrode active material for a lithium ion battery, and particularly relates to a positive electrode active material, a positive electrode for a secondary battery, and a lithium ion battery having high crystallinity and high safety while being able to ensure high capacity.

In recent years, there is a rapidly growing demand for a non-aqueous electrolyte lithium secondary battery as a high energy density battery. This lithium secondary battery is configured from three fundamental components; namely, a positive electrode, a negative electrode, and a separator retaining an electrolyte interposed between these electrodes.

As the positive electrode and negative electrode, a slurry obtained by mixing and dispersing active materials, conductive materials, bonding materials and plasticizing agents (where appropriate) in a dispersion medium is used by being supported by a collector such as a metallic foil or a metallic mesh.

Under the foregoing circumstances, as the positive electrode active material, composite oxide of lithium and transition metal; in particular, cobalt-based composite oxide, nickel-based composite oxide, and manganese-based composite oxide are typical examples. These lithium composite oxides are generally synthesized by mixing the compound of the constitution element (carbonate and oxide of Mn, Fe, Co, Ni and the like) and lithium compound (lithium carbonate and the like) at a predetermined ratio, and performing heat treatment (oxidation treatment) thereto (refer to Patent Document 1, Patent Document 2, and Patent Document 3).

Under the foregoing circumstances, a ternary positive electrode material of Ni:Mn:Co=1:1:1 composition has been proposed (refer to Patent Document 4). In the case of Patent Document 4, the Li/metal ratio is 0.97 to 1.03, and it describes that it is possible to obtain a discharge capacity of 200 mAh/g. Nevertheless, in the foregoing case, since the charge cutoff voltage is a high voltage of 4.7 V, if the voltage is cut at 4.3 V, the initial discharge capacity will be roughly 150 mAh/g.

Generally speaking, the initial performance, cycle life or internal resistance of a battery will differ considerably depending on the crystal structure of the material. Even if the material is of a layered structure, there is a problem in that the battery performance will deteriorate if a spinel structure or the like coexists locally.

Thus, the identification of the crystal structure is important, but the identification of the crystal structure was conventionally based on XRD (X-ray diffraction). Nevertheless, it was difficult to determine the coexistence of phases due to reasons such as the peak positions being close.

In light of the above, a proposal has been made for defining the positive electrode active material based on Raman spectrometry (refer to Patent Document 5). Patent Document 5 defines the peak intensity ratio of the spinel structure and the hexagonal structure in the Raman spectrum analysis based on the chemical formula of $LiCoMA_2$ (0.95≤Li≤1.0, wherein A contains O, F, S, P). However, since the main peak is the peak of the spinel structure and not a layered structure, it cannot be said that sufficient performance have been obtained.

As described above, a lithium secondary battery material yields superior performance compared to conventional technology, but further improvement is demanded in terms of sinterability and battery performance.

Layered lithium nickel-manganese-cobalt composite oxide as a positive electrode active material for a lithium ion battery has high expectations, since it has high capacity and high safety compared to lithium cobalt oxide and lithium manganese oxide. Nevertheless, there is limited literature regarding its composition and crystallinity, and with respect to the lattice constant in particular, descriptions are provided only in terms of its approximate width.

There are the following Patent Documents (refer to Patent Documents 6 to 9) that define the lattice constant in a positive electrode active material for a lithium ion battery having a composition of $LiaNixMnyCozO_2$.

For example, Patent Document 6 describes a lithium-nickel-manganese cobalt-based composite oxide for a lithium secondary battery positive electrode material in which the lattice constant is within the range of 2.855 Å≤a≤2.870 Å, 14.235 Å≤c≤14.265 Å. Patent Document 7 describes a layered lithium nickel-based composite oxide in which the bulk density is 2.0 g/cc or more, the median size of secondary particles is 9 to 20 um, and the BET specific surface area is 0.5 to 1 $m^2$/g. Patent Document 8 describes a lithium-containing transition metal composite oxide in which the lattice constant of the a axis is 2.895 to 2.925 Å, and the lattice constant of the c axis is 14.28 to 14.38 Å. Patent Document 9 describes a lithium-containing transition metal composite oxide in which the lattice constant of the a axis is 2.830 to 2.890 Å, and the lattice constant of the c axis is 14.150 to 14.290 Å.

Nevertheless, although the lattice constant of the a axis and the lattice constant of the c axis are defined, there is no in-depth description regarding the composition and molar volume. Thus, there is a problem in that the foregoing Patent Documents are insufficient in terms of ensuring the performance and safety of the lithium ion battery.

Patent Document 1: Japanese Published Unexamined Patent Application No. H1-294364
Patent Document 2: Japanese Published Unexamined Patent Application No. H11-307094
Patent Document 3: Japanese Published Unexamined Patent Application No. 2005-285572
Patent Document 4: Japanese Published Unexamined Patent Application No. 2003-59490
Patent Document 5: Japanese Published Unexamined Patent Application No. 2005-44785
Patent Document 6: Japanese Published Unexamined Patent Application No. 2006-253119
Patent Document 7: Japanese Patent No.4003759
Patent Document 8: Japanese Published Unexamined Patent Application No. 2002-145623
Patent Document 9: Japanese Published Unexamined Patent Application No. 2003-068298

SUMMARY OF THE INVENTION

As described above, the layered lithium nickel-manganese-cobalt composite oxide as the positive electrode active material for a lithium ion battery is a material that has high expectations since it has high capacity and high safety compared to lithium cobalt oxide and lithium manganese oxide, but its composition and crystallinity have not been sufficiently clarified. In light of this point, an object of the present invention is to study and define the relationship of the cobalt (Co) ratio and the lattice constant, which are considered to primarily influence the crystal structure in the foregoing composition, and thereby obtain a positive electrode active material having high crystallinity, high capacity and high safety. Another object of this invention is to obtain, by using the foregoing material, a positive electrode active material for a lithium ion battery that is able to further ensure the performance and safety of the lithium ion battery.

In order to achieve the foregoing object, the present invention provides the following:

1) A positive electrode active material for a lithium ion battery positive electrode material made of lithium-containing nickel-manganese-cobalt composite oxide of a layered structure represented with $Li_aNi_xMn_yCo_zO_2$ ($1.0<a<1.3$, $0.8<x+y+z<1.1$), wherein, in a region with a molar volume Vm that is estimated from a lattice constant calculated from a (018) plane and a (113) plane in a powder X-ray diffraction pattern using CuK alpha rays as a vertical axis and Co ratio n (molar %) in metal components as a horizontal axis, the relationship thereof is within a range of Vm=21.276-0.0117n as an upper limit and Vm=21.164-0.0122n as a lower limit, and a half value width of both the (018) plane and the (113) plane is 0.200° (degrees) or less.

2) The positive electrode active material for a lithium ion battery positive electrode material according to 1) above, wherein the average particle size of the oxide powder is 5 μm or more and 10 μtm or less, the specific surface area is 1.0 m²/g or more and 1.6m²/g or less, and the tap density is 1.5 or more and 2.0 or less.

3) A positive electrode for a lithium ion secondary battery using the positive electrode active material according to 1) or 2) above.

4) A lithium ion secondary battery using the positive electrode according to 3) above.

As a result of defining the relationship of the cobalt (Co) ratio and the lattice constant, which are considered to primarily influence the crystal structure in the foregoing composition, the present invention is able to obtain a positive electrode active material having high crystallinity, high capacity and high safety. By using this material, the present invention yields a superior effect of being able to obtain a positive electrode active material for a lithium ion battery that is able to further ensure the characteristics and safety of the lithium ion battery.

DETAILED DESCRIPTION OF THE INVENTION

A lithium-containing transition metal oxide is generally used as a positive electrode active material or a lithium ion battery. Specifically, lithium cobalt oxide ($LiCoO_2$), lithium nickel oxide ($LiNiO_2$), lithium manganese oxide ($LiMn_2O_4$) or the like is used, and these are compounded in order to improve the performance (high capacity, cycle life, storage performance, reduction of internal resistance, discharge properties) and increase the safety. As the positive electrode active material of a lithium ion battery according to the present invention, a ternary positive electrode material having a layered structure; namely $Li_aNi_xMn_yCo_zO_2$ ($1.0<a<1.3$, $0.8<x+y+z<1.1$) is used. As shown in Examples 1 to 8 disclosed herein, x+y+z may equal 1. As a result of studying in detail the X-ray diffraction pattern using CuK alpha rays with respect to the foregoing material having a layered structure, the present inventors discovered that, when a material having high capacity and high safety is obtained, there is a certain correlation in the molar volume that is estimated from the lattice constant calculated from the (018) plane and the (113) plane, and the Co ratio of the ternary positive electrode material, and that the average particle size, the specific surface area, and the tap density should be within a predetermined range.

Specifically, the crystal structure is a structure that belongs to a layered R3 m. Moreover, the a value representing the ratio of Li in relation to all metals desirably exceeds 1.0 and is less than 1.3. This is because if the ratio is 1.0 or less it is difficult to retain a stable crystal structure, and if it is not less than 1.3 it is impossible to ensure high capacity.

Moreover, the (x+y+z) value representing the molar ratio of all metals shall be a range that exceeds 0.8 and less than 1.1. If the value is 0.8 or less, the amount of oxygen is great and it will be difficult to ensure capacity, and if the value is 1.1 or more, oxygen defect occurs and it will be difficult to ensure safety.

The molar volume (Vm) in this crystal structure can be calculated by employing the following formula based on the X-ray diffraction pattern that is obtained by using CuK alpha rays. Here, a represents the lattice constant of the a axis and c represents the lattice constant of the c axis.

$$Vm=0.17906 \times a \times a \times c$$

Moreover, the lattice constant (a, c) can also be obtained from a relational expression of hexagonal spacing and the lattice constant. A more detailed lattice constant will require the use of data on the high-angle side, but here, data of the (018) plane and the (113) plane is used. Note that the (018) plane is positioned at 2θ=64.0 to 64.4° and the (113) plane is positioned at 2θ=67.8 to 68.2°. The Co ratio n in the metal components can be represented with the following mathematical formula by using x, y z of the foregoing chemical formula.

$$n=z \times 100/(x+y+z)$$

When Vm and n are plotted, the correlation of Vm and n can be found if it is a material capable of ensuring high capacity and high safety, and it was discovered that it will be within a range that is defined according to the following formula in a region when taking Vm as the vertical axis and n as the horizontal axis.

Vm=21.276-0.0117n (upper limit)
Vm=21.164-0.122n (lower limit)

It is difficult to ensure the capacity in a region that exceeds the upper limit, and it is difficult to ensure the safety in a region that falls below the lower limit. Accordingly, the foregoing range takes on major significance.

With respect to the crystallinity, the half value width of both the (018) plane and the (113) plane is desirably 0.200° or less, preferably, 0.180° or less. Outside the foregoing range, the crystallinity is inferior and it is difficult to ensure high capacity.

Moreover, with the powder characteristics, preferably, the average particle size is 5 μm or more and 10 μm or less, the specific surface area is 1.0 m²/g or more and 1.8 m²/g or less, and the tap density is 1.5 or more and 2.0 or less. More preferably, the average particle size is 6 μm or more and 9 μm or less, the specific surface area is 1.1 m²/g or more and 1.6 m²/g or less, and the tap density is 1.6 or more and 2.0 or less. If this range is deviated, the coating properties will deteriorate, it is difficult to ensure high capacity, and safety may be affected.

In addition, the foregoing positive electrode active material can be used to prepare a positive electrode for a lithium ion battery, and such positive electrode can be used to further produce a lithium ion battery.

Table 1 satisfy the conditions claimed in claim 1; specifically "within a range of Vm=21.276-0.0117n as an upper limit and Vm=21.164-0.0122n as a lower limit, and a half value width of both the (018) plane and the (113) plane is 0.200° or less." For ease of understanding, the foregoing "within a range of Vm=21.276-0.0117n as an upper limit and Vm=21.164-0.0122n as a lower limit" is shown in FIG. 1. The horizontal axis of FIG. 1 is the n: Co ratio (molar %) and the vertical axis is the Vm: molar volume (CC/mole). The range between the two lines; namely, the upper and lower lines in FIG. 1 shows the range of the conditions of the present invention, and eight circles (○) corresponding to Example 1 to Example 8 are plotted.

TABLE 1

| Sample No. | Ni Molar % | Mn Molar % | Co Molar % | a Å | c Å | Molar Volume cc/mole | Half Value Width (018) Degrees (°) | Half Value Width (113) Degrees (°) |
| --- | --- | --- | --- | --- | --- | --- | --- | --- |
| 1 | 70 | 20 | 10 | 2.878 | 14.231 | 21.105 | 0.165 | 0.176 |
| 2 | 60 | 25 | 15 | 2.874 | 14.236 | 21.051 | 0.165 | 0.188 |
| 3 | 70 | 10 | 20 | 2.869 | 14.205 | 20.941 | 0.153 | 0.188 |
| 4 | 50 | 20 | 30 | 2.863 | 14.210 | 20.853 | 0.176 | 0.153 |
| 5 | 33 | 33 | 34 | 2.858 | 14.226 | 20.802 | 0.176 | 0.165 |
| 6 | 25 | 25 | 50 | 2.852 | 14.205 | 20.685 | 0.141 | 0.141 |
| 7 | 16.5 | 25 | 58.5 | 2.842 | 14.192 | 20.521 | 0.153 | 0.129 |
| 8 | 8 | 25 | 67 | 2.837 | 14.152 | 20.395 | 0.153 | 0.165 |

EXAMPLES

The present invention is now explained with reference to the Examples and Comparative Examples. These Examples are merely illustrative, and the present invention shall in no way be limited thereby. In other words, various modifications and other embodiments based on the technical spirit claimed in the claims shall be included in the present invention as a matter of course.

Examples 1 to 8

Carbonate as a precursor was prepared with the wet process using a chloride solution of Fe, Ni, Mn, Co and lithium carbonate. This was dried and subsequently subject to oxidation treatment to prepare the positive electrode material having the composition shown in Table 1. Table 1 shows Sample No. 1 to Sample No. 8 corresponding to Examples 1 to 8. The Li, Ni, Mn, Co content is measured with ICP, and the Co ratio was obtained as the Co content relative to the total content of the respective metals excluding Li. The lattice constant was obtained from the spacing of the (018) plane and the (113) plane in the powder X-ray diffraction pattern using CuK alpha rays, and by calculating the molar volume. Moreover, the half value width of the (018) plane and the (113) plane was also measured and these results are similarly shown in Table 1. The conditions shown in Sample No. 1 to Sample No. 8 of In addition, the average particle size was obtained as the 50% diameter in the particle size distribution based on the laser diffraction method, the specific surface area was obtained as the BET value, and the tap density was obtained as the density after tapping 200 times. The positive electrode material, the conductive material, and the binder were weighed at a ratio of 85:8:7. The binder was dissolved in an organic solvent (N-methylpyrrolidone), a material and a conductive material were mixed to form a slurry, and this was applied on an Al foil and dried and pressed to form a positive electrode. Note that well-known standard materials may be used as the conductive material and the binder, and are not specified herein. Subsequently, a 2032-type coin cell for evaluation having Li as the counter electrode was prepared, and, upon dissolving 1M-LiPF₆ in EC-DMC (1:1) as the electrolytic solution, this was used to perform charging and discharging at a charging condition of 4.3V and a discharging condition of 3.0V. The initial discharge capacity was confirmed by confirming the discharge capacity of the charge/discharge at 0.1C. The results are summarized in Table 2. The safety shown in Table 2 was evaluated by charging a coin cell prepared as described above to 4.3V, thereafter extracting the positive electrode material from the cell, performing analysis with a DSC (differential scanning calorimeter), and comparing the exothermic onset temperature. The results upon comparison with LiCoO₂ having a conventional layered structure are similarly shown in Table 2. The evaluation results shown in Table 2 are as follows ○ (safer), Δ (same as before), ×(inferior).

TABLE 2

| Sample No. | Ni Molar % | Mn Molar % | Co Molar % | Average Grain Size μm | Specific Surface area m²/g | Tap Density g/cc | Capacity mAh/g | Safety |
| --- | --- | --- | --- | --- | --- | --- | --- | --- |
| 1 | 70 | 20 | 10 | 5.5 | 1.52 | 1.7 | 186 | ○ |
| 2 | 60 | 25 | 15 | 5.5 | 1.47 | 1.6 | 180 | ○ |

TABLE 2-continued

| Sample No. | Ni Molar % | Mn Molar % | Co Molar % | Average Grain Size μm | Specific Surface area m²/g | Tap Density g/cc | Capacity mAh/g | Safety |
|---|---|---|---|---|---|---|---|---|
| 3 | 70 | 10 | 20 | 6.2 | 1.36 | 1.8 | 190 | ○ |
| 4 | 50 | 20 | 30 | 6.8 | 1.36 | 1.7 | 170 | ○ |
| 5 | 33 | 33 | 34 | 5.8 | 1.36 | 2.0 | 155 | ○ |
| 6 | 25 | 25 | 50 | 6.3 | 1.47 | 1.6 | 156 | ○ |
| 7 | 16.5 | 25 | 58.5 | 5.8 | 1.16 | 1.7 | 148 | ○ |
| 8 | 8 | 25 | 67 | 7.5 | 1.12 | 1.6 | 148 | ○ |

As evident from the results of Table 2, Example 1 to Example 8 (Sample No. 1 to Sample No. 8) all showed a safety of o, and the safety had improved compared to conventional technology. In addition, the capacity in all Examples was 148 mAh/g or more, and in certain cases reached 190 mAh/g. Even in the foregoing case, the safety had improved compared to conventional technology. Accordingly, all materials shown in the Examples are superior as a positive electrode active material for a lithium ion battery positive electrode material.

Note that the Samples shown in Table 2 were selected on the condition that the average particle size, the specific surface area, and the tap density all satisfied the conditions claimed in claim 2, but if the deviation is approximately ±20% from the conditions of claim 2, changes in the capacity and safety were not significant. Specifically, the discharge capacity exceeded 140 mAh/g, and the safety was (○) which improved than before, or (Δ) which was the same as before.

Accordingly, it is easy to understand that the primary requirement is to satisfy the condition of "within a range of Vm=21.276-0.0117n as an upper limit and Vm=21.164-0.0122n as a lower limit, and a half value width of both the (018) plane and the (113) plane is 0.200° or less" claimed in claim 1. Nevertheless, needless to say, the conditions claimed in claim 2, specifically, "the average particle size of the oxide powder is 5 μm or more and 10 μm or less, the specific surface area is 1.0 m²/g or more and 1.6 m²/g or less, and the tap density is 1.5 or more and 2.0 or less" are more favorable conditions.

Oxides of Ni, Mn, Co and lithium carbonate were used and the respective raw materials were mixed and pulverized, thereafter subject to spray drying and oxidation treatment to obtain a positive electrode material. The positive electrode material was subject to the same treatment as the Examples and evaluated similarly. The molar volume, the half value width (018), and the half value width (113) are shown in Table 3. All conditions described in Table 3 are the same as the conditions described in Examples 1 to 8. Sample No. 9 to Sample No. 17 shown in Table 3 and Table 4 described later respectively correspond to Comparative Example 1 to Comparative Example 9. In addition, Table 4 shows the average particle size, the specific surface area, and the tap density of Sample No. 9 to Sample No. 17. The capacity and safety are also similarly shown. Note that Comparative Examples 1 to 9 (Sample No. 9 to Sample No. 17) exist outside of the "range of Vm=21.276-0.0117n as an upper limit and Vm=21.164-0.0122n as a lower limit" shown in FIG. 1, and nine squares (□) corresponding to Comparative Example 1 to Comparative Example 9 are plotted.

TABLE 3

| Sample No. | Ni Molar % | Mn Molar % | Co Molar % | a Å | c Å | Molar Volume cc/mole | Half Value Width (018) Degrees (°) | Half Value Width(113) Degrees (°) |
|---|---|---|---|---|---|---|---|---|
| 9 | 45 | 45 | 10 | 2.903 | 14.340 | 21.639 | 0.188 | 0.188 |
| 10 | 30 | 50 | 20 | 2.858 | 14.239 | 20.826 | 0.165 | 0.144 |
| 11 | 37.5 | 37.5 | 25 | 2.877 | 14.248 | 21.117 | 0.188 | 0.188 |
| 12 | 33 | 33 | 34 | 2.850 | 14.233 | 20.701 | 0.165 | 0.165 |
| 13 | 33 | 33 | 34 | 2.865 | 14.245 | 20.937 | 0.153 | 0.188 |
| 14 | 27 | 27 | 46 | 2.842 | 14.218 | 20.563 | 0.165 | 0.165 |
| 15 | 25 | 25 | 50 | 2.855 | 14.224 | 20.760 | 0.188 | 0.165 |
| 16 | 15 | 15 | 60 | 2.852 | 14.152 | 20.612 | 0.165 | 0.188 |
| 17 | 15 | 15 | 60 | 2.841 | 14.120 | 20.407 | 0.144 | 0.165 |

TABLE 4

| Sample No. | Ni Molar % | Mn Molar % | Co Molar % | Average Grain Size μm | Specific Surface Area m²/g | Tap Density g/cc | Capacity mAh/g | Safety |
|---|---|---|---|---|---|---|---|---|
| 9 | 45 | 45 | 10 | 11.8 | 0.94 | 2.0 | 140 | Δ |
| 10 | 30 | 50 | 20 | 12.5 | 0.88 | 2.2 | 130 | Δ |
| 11 | 37.5 | 37.5 | 25 | 12.2 | 0.85 | 1.8 | 150 | x |
| 12 | 33 | 33 | 34 | 12.8 | 0.92 | 2.1 | 145 | x |
| 13 | 33 | 33 | 34 | 12.8 | 0.92 | 2.1 | 135 | Δ |
| 14 | 27 | 27 | 46 | 12.5 | 0.88 | 2.1 | 142 | x |
| 15 | 25 | 25 | 50 | 12.6 | 0.90 | 2.0 | 135 | Δ |
| 16 | 15 | 15 | 60 | 12.8 | 0.88 | 2.2 | 130 | Δ |
| 17 | 15 | 15 | 60 | 12.9 | 0.85 | 2.2 | 135 | x |

As evident from Table 3, Table 4 and FIG. 1, certain Samples showed high discharge capacity at 150 mAh/g (Sample No. 11) and 145 mAh/g (Sample No. 12), but in these cases the safety was inferior. The other Samples were all 140 mAh/g or less, had low capacity, or had safety that was the same as before or inferior than conventional technology.

Accordingly, the safety of Comparative Example 1 to Comparative Example 9 (Sample No. 9 to No. 17) was o or x in all cases, and the safety was the same as before or inferior than conventional technology. In addition, the capacity was also the same as before or inferior than conventional technology.

Based on the foregoing comparison of the Examples and the Comparative Examples, it is evident that the materials shown in the Examples are all superior as a positive electrode active material for a lithium ion battery positive electrode material.

Since the positive electrode active material for a lithium ion battery positive electrode material according to the present invention is in a region with a molar volume Vm that is estimated from a lattice constant calculated from a (018) plane and a (113) plane in a powder X-ray diffraction pattern using CuK alpha rays as a vertical axis and Co ratio n (molar %) in metal components as a horizontal axis, the relationship thereof is within a range of Vm=21.276-0.0117n as an upper limit and Vm=21.164-0.0122n as a lower limit, and a half value width of both the (018) plane and the (113) plane is 0.200° or less, it yields a superior effect of being able to obtain a positive electrode active material having high crystallinity, high capacity and high safety. Thus, the present invention is effective as a lithium secondary battery material.

BRIEF DESCRIPTION OF DRAWINGS

FIG. 1 is a diagram showing a range in which Vm=21.276-0.0117n is the upper limit and Vm=21.164-0.0122n is the lower limit in a region with the molar volume Vm as the vertical axis and Co ratio n (molar %) as the horizontal axis, and which plots the conditions of the Examples and the Comparative Examples.

The invention claimed is:

1. An active material for a positive electrode of a lithium ion battery, said active material being made of a composite oxide of lithium, nickel, manganese and cobalt represented by a formula $Li_aNi_xMn_yCo_zO_2$, where $1.0<a<1.3$, $x+y+z=1$, $0.10 \leq y \leq 0.25$, and $0.10 \leq z \leq 0.67$, and having a layered structure, wherein, in a space expressed by, as an ordinate, a molar volume Vm of the active material calculated by lattice constants determined from diffraction angles of a (018) plane and a (113) plane appearing on a powder X-ray diffraction pattern of the active material obtained by using CuK alpha radiation and, as an abscissa, Co atom ratio n (molar %) defined by $100z/(x+y+z)$ of the active material, Vm and n obtained with the active material exist within a range defined by Vm=21.276-0.0117n as an upper limit and Vm=21.164-0.0122n as a lower limit, and wherein a diffraction peak of the (018) plane of the active material has a half value width of 0.200° to 0.141° and a diffraction of the (113) plane of the active material has a half value width of 0.200° to 0.129°.

2. The active material according to claim 1, wherein the composite oxide is of a form of particles of powder having an average particle size of 5 μm or more and 10 μm or less, a specific surface area of the particles of powder of 1.0 m²/g or more and 1.6 m²/g or less, and a tap density of 1.5 g/cc or more and 2.0 g/cc or less.

3. The active material according to claim 2, where $0.50 \leq x \leq 0.70$ and $0.10 \leq z \leq 0.30$ in the formula $Li_aNi_xMn_yCo_zO_2$.

4. The active material according to claim 2, where $0.08 \leq x \leq 0.25$ and $0.50 \leq z \leq 0.67$ in the formula $Li_aNi_xMn_yCo_zO_2$.

5. The active material according to claim 4, where y=0.25 in the formula $Li_aNi_xMn_yCo_zO_2$.

6. A positive electrode for a lithium ion secondary battery made of the active material according to claim 1.

7. A lithium ion secondary battery having the positive electrode according to claim 6.

8. The active material according to claim 1, wherein the Co atom ratio is 20 to 67 molar %.

9. The active material according to claim 8, wherein the composite oxide is of a form of particles of powder having an average particle size of 5 μm or more and 10 μm or less, a specific surface area of 1.0 m²/g or more and 1.6 m²/g or less, and a tap density of 1.5 g/cc or more and 2.0 g/cc or less.

10. A positive electrode for a lithium ion secondary battery made of the active material according to claim 9.

11. A lithium ion secondary battery having the positive electrode according to claim 10.

12. The active material according to claim 8, where $0.08 \leq x \leq 0.25$ and $0.50 \leq z \leq 0.67$ in the formula $Li_aNi_xMn_yCo_zO_2$.

13. The active material according to claim 12, where y=0.25 in the formula $Li_aNi_xMn_yCo_zO_2$.

14. The active material according to claim 8, where $0.50 \leq x \leq 0.70$, $0.10 \leq y \leq 0.20$, and $0.20 \leq z \leq 0.30$ in the formula $Li_aNi_xMn_yCo_zO_2$.

15. The active material according to claim 1, where $0.50 \leq x \leq 0.70$ and $0.10 \leq z \leq 0.30$ in the formula $Li_aNi_xMn_yCo_zO_2$.

16. The active material according to claim 1, where $0.08 \leq x \leq 0.25$ and $0.50 \leq z \leq 0.67$ in the formula $Li_aNi_xMn_yCo_zO_2$.

17. The active material according to claim 16, where y=0.25 in the formula $Li_aNi_xMn_yCo_zO_2$.

* * * * *